US006416210B1

(12) United States Patent
Uchida

(10) Patent No.: US 6,416,210 B1
(45) Date of Patent: Jul. 9, 2002

(54) HEADLAMP FOR A VEHICLE

(75) Inventor: Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/614,796

(22) Filed: Jul. 12, 2000

(30) Foreign Application Priority Data

Jul. 12, 1999 (JP) .......................................... 11-197086

(51) Int. Cl.[7] .................................................. B60Q 1/00

(52) U.S. Cl. ........................ 362/539; 362/538; 362/522; 362/338; 362/340

(58) Field of Search ................................ 362/520, 522, 362/538, 539, 310, 338, 340

(56) References Cited

U.S. PATENT DOCUMENTS 4,517,630 A * 5/1985 Dieffenbach et al. ... 362/310 X
4,796,171 A 1/1989 Lindae et al. ............... 362/308
5,014,173 A 5/1991 Lindae et al. ............... 362/309
5,305,189 A * 4/1994 Sekiguchi ................... 362/538

FOREIGN PATENT DOCUMENTS

DE 4031352 4/1992 ............ F21M/3/12

OTHER PUBLICATIONS

Combined Search and Examination Report.

* cited by examiner

*Primary Examiner*—Stephen Husar
(74) *Attorney, Agent, or Firm*—Fish & Richardson P.C.

(57) ABSTRACT

An upwardly deflecting prism lens element is formed horizontally across a front-side surface of a focusing lens. The light-dark ratio of a borderline in a low-beam luminous intensity distribution pattern is reduced by upwardly deflecting a light beam, which is transmitted through the focusing lens and illuminated forwardly from the lens element. Chromatic aberration is not produced by the light beam transmitted through the lens element and radiated in the forward direction.

10 Claims, 10 Drawing Sheets

HEADLAMP FOR A VEHICLE

FIELD OF THE INVENTION

The invention relates to a projector-type headlamp for a vehicle, and more particularly to a low-beam headlamp.

BACKGROUND OF THE INVENTION

Projector-type headlamps are frequently adopted as headlamps for vehicles.

As shown in FIG. 1, a projector-type headlamp comprises a light source 102 disposed on an optical axis Ax of the headlamp which extends in the longitudinal direction of a vehicle, a reflector 104 for reflecting light from this light source 102 in a forward direction close to the optical axis Ax, and a focusing lens 106 disposed forwardly of the reflector 104 and formed by a plano-convex lens whose front-side surface 106*a* is convex.

Further, a light shielding plate 108 is used to eliminate upward illuminating light in low beam by shielding part of the reflected light from the reflector 104. As shown in FIG. 1, the plate 108 is disposed between the focusing lens 106 and the reflector 104. For the reflected light with shielding, a luminous intensity distribution pattern P with a light-dark borderline CL is formed, as shown in FIG. 2.

SUMMARY OF THE INVENTION

With a conventional headlamp for a vehicle, the light-dark ratio of the borderline CL formed by the light shielding plate 108 becomes very high. If the light-dark ratio of the borderline CL is excessively high, the forward road surface can suddenly appear dark along the way, depending on the travel condition. A problem can happen when at night a vehicle approaches a flat road from a downward slope, which degrades the visibility of the far road surface. In addition, if a vehicle bounces to cause the borderline CL to move vertically even slightly, a driver of a vehicle on the opposite lane may be blinded by glare.

The invention has been devised in view of the above-described circumstances. The object is to provide a projector-type headlamp for a vehicle capable of addressing the problems of the light-dark ratio of the light-dark borderline in the luminous intensity distribution pattern for low beam light. The invention is capable of realizing the object without producing drawbacks such as irregular color produced by chromatic aberrations.

The above object is attained by forming a predetermined lens element on a front-side surface of a focusing lens of a headlamp.

A projector-type headlamp provided for a vehicle comprises: a light source disposed on an optical axis extending in a longitudinal direction of a vehicle; a reflector for reflecting light from the light source in a forward direction close to the optical axis; a focusing lens disposed forwardly of the reflector and formed by a plano-convex lens whose front-side surface is convex; and a light shielding plate interposed between the focusing lens and the reflector so as to eliminate upward illuminating light by shielding part of the reflected light from the reflector, wherein a lens element extending in a substantially horizontal direction along a line of intersection between the front-side surface and a horizontal plane including the optical axis is formed on the front-side surface of the focusing lens.

As long as the "lens element" has either a vertical deflection function or diffusion function, its cross-sectional shape, vertical width, and the number of the lens elements should not be limiting.

In a typical projector-type headlamp, the borderline in the luminous intensity distribution pattern for low beam, which is formed by a light shielding plate, is formed clearly by a light beam in a horizontal plane including the optical axis Ax of the headlamp. In a projector-type headlamp according to embodiments of the invention, the light-dark ratio of the borderline can be reduced by the lens element. The lens element is formed on the front-side surface of the focusing lens, which can be a plano-convex lens whose front-side surface is convex. The lens element extends in the horizontal direction along the line of intersection between the front-side surface and the horizontal plane including the optical axis.

A light beam transmitted through the lens element may cause irregular color to occur because of chromatic aberrations. The aberrations can affect the luminous intensity distribution pattern. However, the reflected light from the reflecting surface of the reflector is not incident upon the peripheral edge of the focusing lens in the region close to a line of intersection between the front-side surface and a horizontal plane, including the optical axis, in the front-side surface of the focusing lens. Therefore, the lens element of the embodiment of the invention does not cause the transmitted light beam to undergo chromatic aberrations to affect the luminous intensity distribution pattern.

In accordance with the invention, the projector-type headlamp can reduce the light-dark ratio of the borderline in the luminous intensity distribution pattern for low beam without producing drawbacks such as irregular color.

From the viewpoint of reducing the light-dark ratio of the borderline, a crimp or the like may be formed on the focusing lens instead of forming the lens element on the front-side surface of the focusing lens as in the invention. However, it is difficult to control deflection or diffusion of the transmitted light by means of a crimp or the like. Consequently, the light-dark ratio of the borderline CL can be insufficient reduced, or the light-dark ratio can be overly reduced to increase the upward illuminating light. Such upward illuminating light may temporary blind a driver in a vehicle on the opposite lane. In this respect, since the lens element can be formed on the front-side surface of the focusing lens, deflection and diffusion of the transmitted light can be controlled relatively accurately. Hence, the light-dark ratio of the borderline can be reduced to a necessary and sufficient level.

In addition, by forming a lens element on the front-side surface of the focusing lens, the following advantages can be obtained.

A focusing lens can be a plano-convex lens whose front-side surface is convex. After a lens material is filled in a mold having a cavity shape conforming to the shape of the front-side surface and is allowed to cure, the focusing lens can be manufactured by cutting its rear-side surface in a plane. If an attempt were made to form a lens element on the rear-side surface of the focusing leans, required cutting work would be more difficult. In contrast, the formation of the lens element on the front-side surface of the focusing lens as embodiments of the invention can be realized easily by adding the shape of the lens element to the mold. For this reason, in accordance with embodiments of the invention, the lens element can be formed with high accuracy at low cost.

Since the light-dark borderline is created by the light shielding plate partly shielding a light beam in a horizontal plane including the optical axis of the headlamp, the lens element is preferably formed to vertically straddle the line of intersection between the front-side surface of the focusing lens and the horizontal plane including the optical axis to reduce the light-dark ratio of the borderline.

In addition, if the lens element comprises an upwardly deflecting prism lens element, the light-dark ratio of the borderline can be reduced with high accuracy by setting its angle of upward deflection to an appropriate value.

Further, if a plurality of lens elements, each extending in a substantially horizontal direction, are formed vertically on the front-side surface of the focusing lens, the light-dark ratio of the borderline can be reduced in fine steps. Furthermore, a portion of those lens elements can be used to illuminate overhead signs.

DETAILED DESCRIPTION OF THE INVENTION

Figure 1:
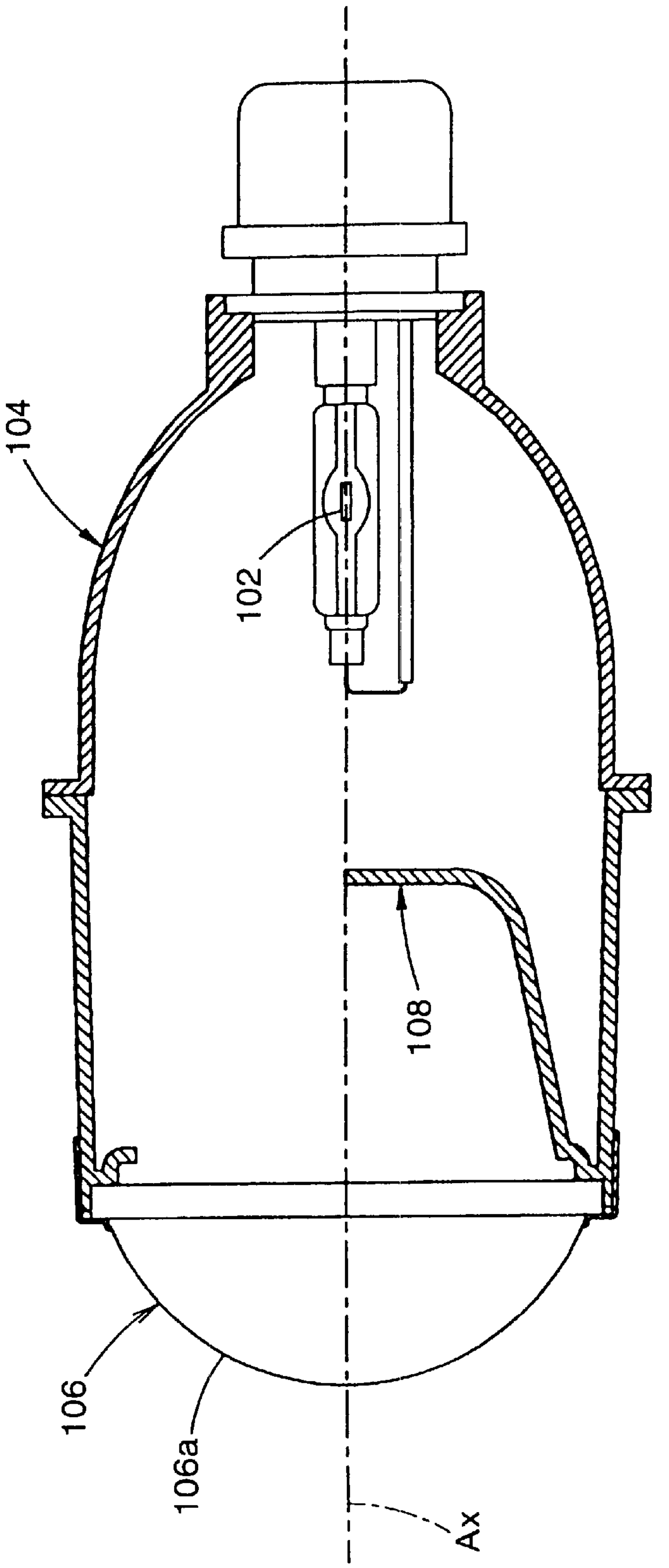
FIG. 1 illustrates a known headlamp.
Figure 2:
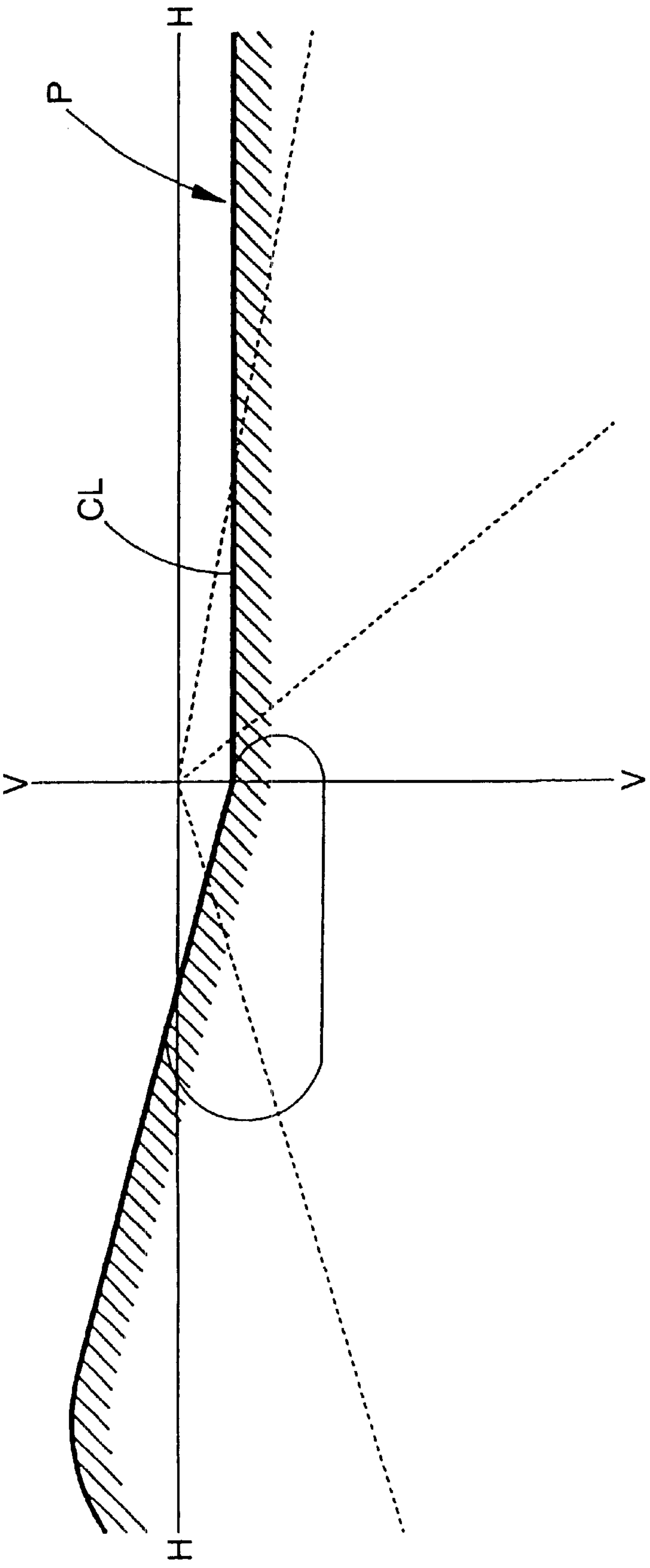
FIG. 2 illustrates an intensity distribution pattern of a known headlamp.
Figure 3:
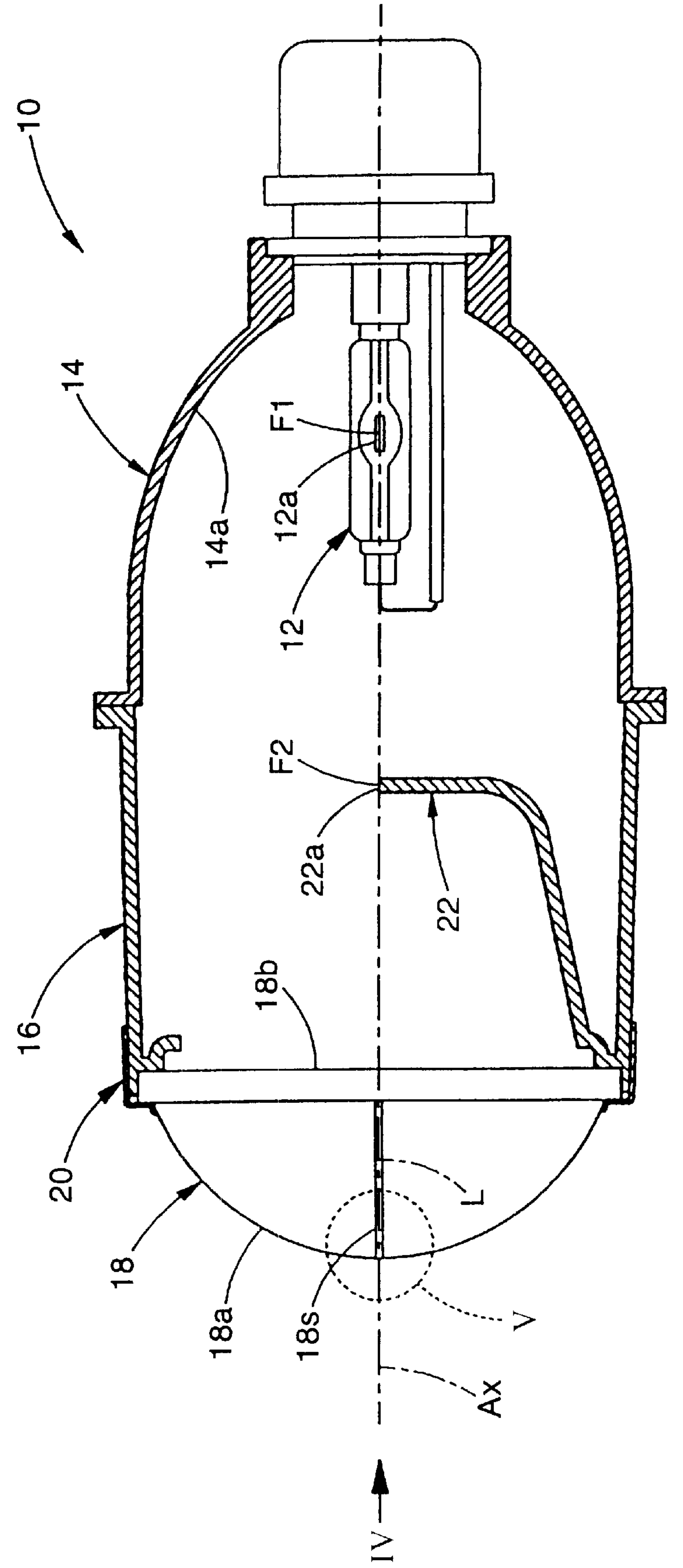
FIG. 3 illustrates a cross-sectional view of a headlamp for a vehicle according to an embodiment of the invention.
Figure 4:
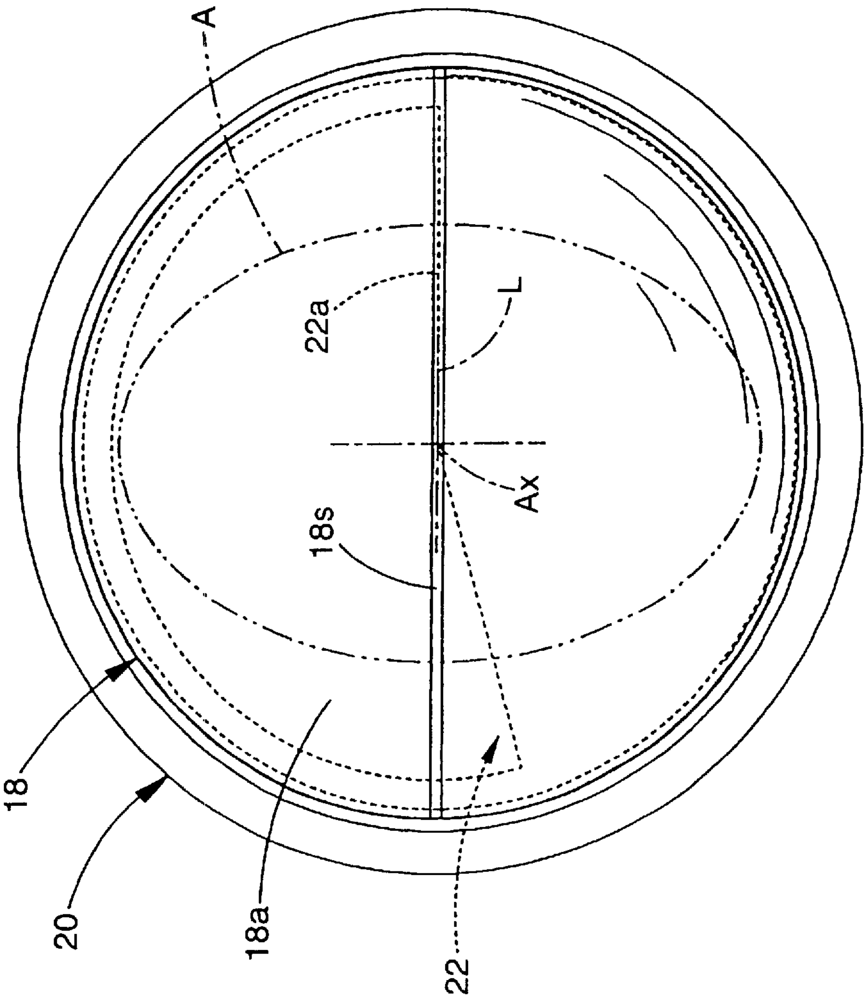
FIG. 4 illustrates a view in the direction of arrow II in FIG. 3.
Figure 5:
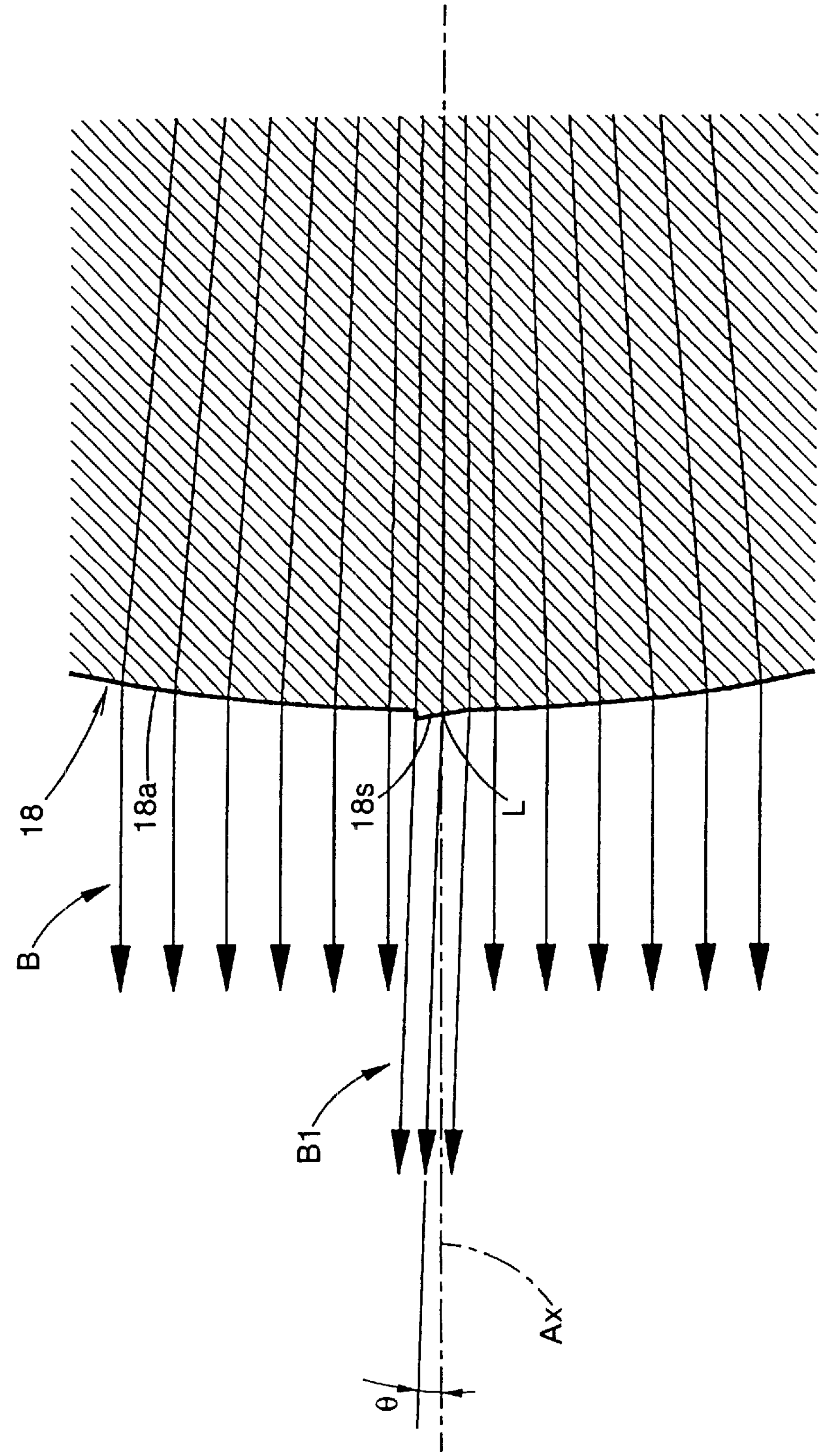
FIG. 5 illustrates a partially enlarged cross-sectional view of portion III in FIG. 3.

FIG. 3 illustrates a cross-sectional view of a headlamp for a vehicle in accordance with an embodiment. FIG. 4 illustrates a view of the headlamp in the direction of arrow II in FIG. 3. FIG. 5 illustrates a partially enlarged cross-sectional view of portion III in FIG. 3.

As shown in FIGS. 3 and 4, the headlamp (lighting appliance) 10 for a vehicle in accordance with the embodiment is a projector-type low-beam headlamp and comprises a discharge bulb 12, a reflector 14, a holder 16, a focusing lens 18, a retaining ring 20, and a light shielding plate 22.

The discharge bulb 12 is a metal halide bulb at a base of the headlamp and is attached to the reflector 14 that extend from the base such that its discharge light-emitting portion **12*a* (light source) is located on an optical axis Ax of the headlamp 10** extending in the longitudinal direction of the vehicle.

The reflector 14 has a substantially ellipsoidal reflecting surface **14*a* having the optical axis Ax as its central axis. The reflecting surface 14*a* is formed such that its cross-sectional shapes including the optical axis Ax of a lighting appliance are elliptic. The eccentricities of the cross-sectional shapes are set so as to become gradually larger from a vertical section toward a horizontal section. However, rear-side vertices of ellipses forming the respective sections are located at the same position. The discharge light-emitting portion 12*a* is disposed at a first focus F1 of the ellipsis, which forms the vertical section of the reflecting surface 14*a*. The reflecting surface 14*a* is adapted to reflect the light from the discharge light-emitting portion 12*a*** in a forward direction close to the optical axis Ax. The light is substantially converged to a second focus F2 of the ellipsis in the vertical section including the optical axis Ax.

The holder 16 is formed in a tubular shape to extend forward from a front-end opening portion **14*b* of the reflector 14. The holder 16 fixes and supports the reflector 14 at its rear-end portion and fixes and supports the focusing lens 18 through the retaining ring 20** at its front-end portion.

The focusing lens 18 is formed by a plano-convex lens whose front-side surface **18*a* facing away from the discharge bulb 12 is convex and whose rear-side surface 18*b* facing towards the discharge bulb 12 is planar. The rear-side focal position is disposed in such a manner as to agree with the second focal point F2 of the reflecting surface 14*a* of the reflector 14. The focusing lens 18 allows the reflected light from the reflecting surface 14*a* to be transmitted in the forward direction to focus the light close to the optical axis Ax. A transmitted-light passage region A in the focusing lens 18 is a vertically elongated elliptic region with the optical axis Ax as the center, as shown by the two-dotted dash line in FIG. 4**.

A lens element **18*s* extends in the horizontal direction along a line of intersection L between the front-side surface 18*a* and a horizontal plane including the optical axis Ax of a lighting appliance. As shown in FIG. 5, the lens element 18*s* is formed by an upwardly deflecting prism lens element which is formed in such a manner as to vertically straddle the line of intersection. Consequently, a light beam B1, which is transmitted through the focusing lens 18 and propagate forwardly from the lens element 18*s*, is adapted to propagate upwardly by a small angle θ with respect to a light beam B emergent from a general portion of the front-side surface 18*a***. The small angle θ is set to a value of, for example, approximately 0.2 to 0.60°.

As shown in FIGS. 3 and 4, the light shielding plate 22 is formed integrally with the holder 16 in such a manner as to be located in a lower portion of the inner space of the holder 16 and is adapted to eliminate the upwardly oriented illuminating light emitted from the lighting appliance 10 by shielding part of the reflected light from the reflecting surface **14*a*. This light shielding plate 22 is formed such that its upper edge 22*a* passes through the second focus F2. In addition, the left-side region (right-side region in the front view of FIG. 4) of the optical axis Ax at this upper edge 22*a* is formed in a horizontal plane including the optical axis Ax, while the right-side region (left-side region in the front view of FIG. 4) of the optical axis Ax at the upper edge 22*a*** is formed in an inclined plane extending 15° diagonally downward from the optical axis Ax.

Figure 6:
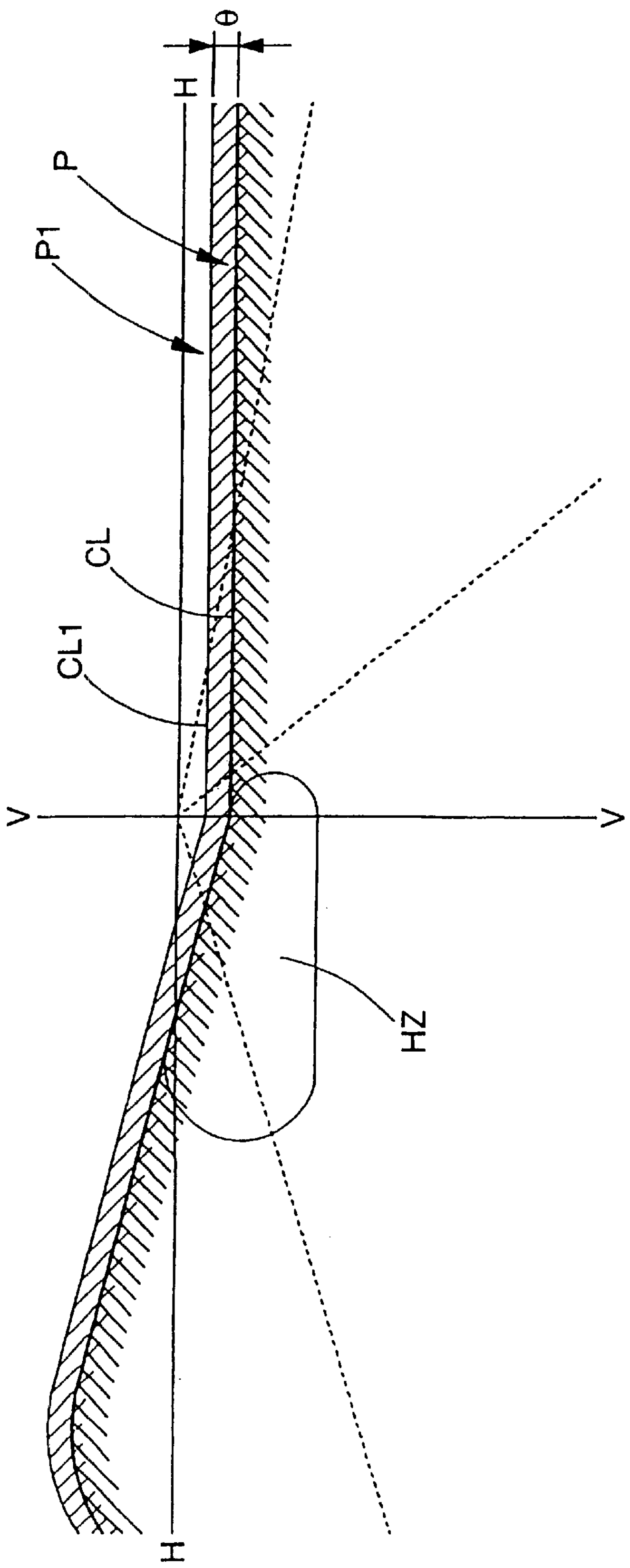
FIG. 6 illustrates a luminous intensity distribution pattern for low beam light of a headlamp according to an embodiment of the invention.

FIG. 6 illustrates a portion of a luminous intensity distribution pattern for low beam, which is formed forwardly of the vehicle by the illuminating light from the headlamp 10.

As shown in FIG. 6, this luminous intensity distribution pattern for low beam comprises a basic luminous intensity distribution pattern P and an additional luminous intensity distribution pattern P1.

The basic luminous intensity distribution pattern P is a pattern formed by the light beam B propagating from the general portion of the front-side surface **18*a* of the focusing lens 18. The pattern P is a distribution pattern having a borderline CL onto which the shape of the upper edge 22*a*** of the light shielding plate 22 is projected. For the borderline CL, the opposite-lane vehicle side is formed by a horizontal cutoff line, and the own vehicle side is formed by an oblique cutoff line which rises at 15° toward the left side from the horizontal cutoff line. A hot zone (high intensity region) HZ of this basic luminous intensity distribution pattern P is formed in the vicinity of the lower side of a right end portion of the oblique cutoff line of the borderline CL.

The additional luminous intensity distribution pattern P1 is a distribution pattern formed by the light beam B1 emergent from the lens element 18*s* of the front-side surface 18*a* of the focusing lens 18. The pattern P1 is formed as a distribution pattern in which the basic luminous intensity distribution pattern P is displaced upwardly by a small angle θ. The intensity of light transmitted through the lens element 18*s* is weaker than the intensity of light transmitted through the general portion other than the lens element 18*s*. However, since the lens element 18*s* transmits a bundle of rays in the horizontal plane including the optical axis Ax, which contributes mostly to the formation of the borderline in the front-side surface 18*a,* the luminous intensity in the vicinity of a borderline CL1 in the additional luminous intensity distribution pattern P1 becomes relatively high. Accordingly, the luminous intensity distribution pattern for low beam as a whole assumes a distribution pattern in which the light-dark ratio of the borderline CL in the basic luminous intensity distribution pattern P is sufficiently reduced by the additional luminous intensity distribution pattern P1.

A description of the operation and effects will be given in accordance with the embodiment.

If the lens element 18*s* were not formed in the headlamp 10, the borderline CL in the luminous intensity distribution pattern for low beam, which is formed by the light shielding plate 22, would be formed clearly by the light beam in the horizontal plane including the optical axis Ax. However, since the lens element 18*s* extending in the horizontal direction along the line of intersection L between the front-side surface 18*a* and the horizontal plane including the optical axis Ax of a lighting appliance is formed on the front-side surface 18*a* of the focusing lens 18, the light-dark ratio of the borderline CL in the basic luminous intensity distribution pattern P is effectively reduced by the light beam B1, which is transmitted through the lens element 18*s* and is radiated in the forward direction.

A light beam, transmitted through a lens element formed at a peripheral edge of the focusing lens and radiated in the forward direction, may cause chromatic aberrations to occur to affect the luminous intensity distribution pattern. However, as the transmitted-light passage region A is shown in FIG. 4, the reflected light from the reflecting surface 14*a* is not incident upon the peripheral edge of the focusing lens 18 in the region close to the line of intersection L between the front-side surface 18*a* and the horizontal plane including the optical axis Ax in the front-side surface 18*a* of the focusing lens 18. Therefore, despite the fact that the lens element 18*s* is formed in such a manner as to extend in the horizontal direction along the line of intersection L over the entire region of the front-side surface 18*a,* irregular color is not produced by the light beam B1 to affect the luminous intensity distribution pattern.

The projector-type headlamp of the embodiment can reduce the light-dark ratio of the borderline in the luminous intensity distribution pattern for low beam without producing drawbacks such as irregular color.

Moreover, the lens element 18*s* of the embodiment can be used to accurately control deflection and diffusion in contrast to a crimp or the like. The light-dark ratio of the borderline CL can be reduced to a necessary and sufficient level. The embodiment can be used to avoid insufficiently reducing the light-dark ratio of the borderline CL or overly reducing the ratio to increase the upward illuminating light that may temporary blind a driver in a vehicle on the opposite lane.

In addition, since the lens element 18*s* of the embodiment is formed not on the rear-side surface 18*b* of the focusing lens 18 but on the front-side surface 18*a,* by adding the lens element shape to a mold in advance, the lens element 18*s* can be formed without requiring cutting work. Hence, the lens element 18*s* can be formed with high accuracy at low cost. Further, the lens element 18*s* is extended in the horizontal direction along the line of intersection L over the entire region of the front-side surface 18*a*. Therefore, the formation of the lens element shape in the mold can be obtained with high accuracy.

Further, the borderline formed by the light shielding plate is generally formed clearly by the light beam in the horizontal plane including the optical axis Ax. The lens element 18*s* of the embodiment is formed to vertically straddle the line of intersection L between the front-side surface 18*a* of the focusing lens 18 and the horizontal plane including the optical axis Ax of a lighting appliance. Therefore, the light-dark ratio of the borderline CL (particularly its horizontal cutoff line) can be effectively reduced.

In addition, the lens element 18*s* of the embodiment is formed by the upwardly deflecting prism lens element, and its angle of upward deflection is set to a small angle q. Therefore, the light-dark ratio of the borderline CL can be reduced with high accuracy.

The vertical width of the lens element 18*s* of the embodiment is preferably set to 3 to 5 mm or thereabouts. However, by appropriately adjusting this vertical width, the degree of reduction of the light-dark ratio of the borderline CL can be set to a desired value.

A description will be given on another embodiment of the invention.

Figure 7:
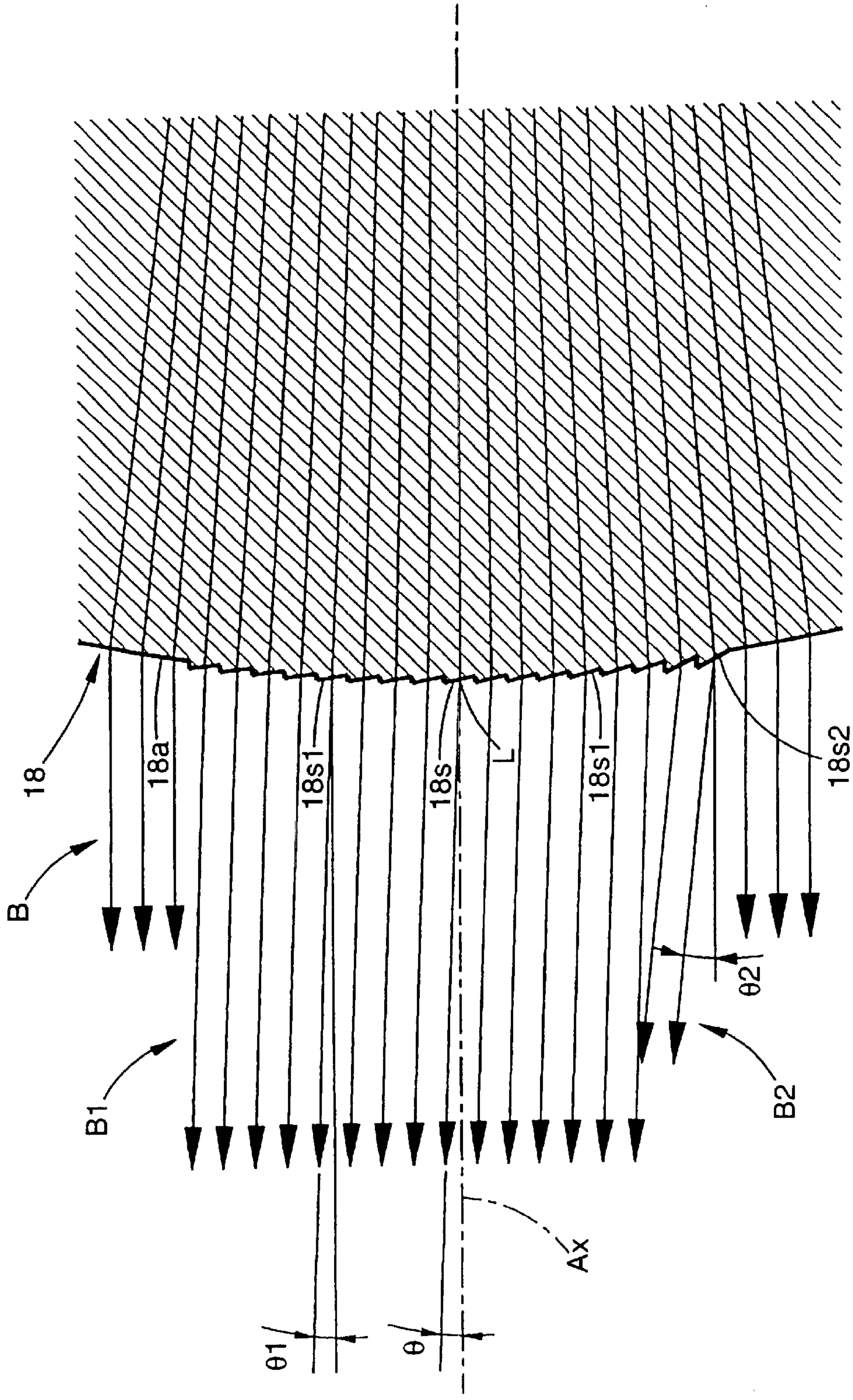
FIG. 7 illustrates a headlamp according to another embodiment of the invention.

FIG. 7 illustrates a portion of a headlamp for a vehicle in accordance with the embodiment.

The basic configuration of the headlamp in accordance with the embodiment is similar to that of the previous embodiment. However, the arrangement of the front-side surface 18*a* of the focusing lens 18 differs from that of the previous embodiment.

The lens element 18*s* of the embodiment is formed to extend in the horizontal direction along the line of intersection L between the front-side surface 18*a* and the horizontal plane including the optical axis Ax. Further, a plurality of lens elements 18*s*1 and 18*s*2 extending in the horizontal direction just as the element 18*s* are formed adjacently on the upper and lower sides of the lens element 18*s*.

Each of the lens elements 18*s,* 18*s*1, and 18*s*2 is formed by the upwardly deflecting prism lens element in the same way as the lens element 18*s* of the previous embodiment, but its vertical width is set to a value (e.g., approximately 1 to 2 mm) smaller than that of the lens element 18*s* of the previous embodiment. In addition, the angle of upward deflection of the lens element 18*s* of the embodiment is set to the same value θ as that of the lens element 18*s* of the previous embodiment, but the angle of upward deflection of each of the lens elements 18*s*1 on the upper and lower sides of the lens element 18*s* is set to a value θ1 slightly different from θ. The angle θ1 is set to a different value for each of the lens elements 18*s*1. The lens element 18*s*2 is formed to be adjacent to the lower side of the lens elements 18$s$1, and its angle of upward deflection $\theta 2$ is set to a value (e.g., approximately 4 to 6°) substantially larger than the angle of upward deflection $\theta$ of the lens element 18$s$.

Figure 8:
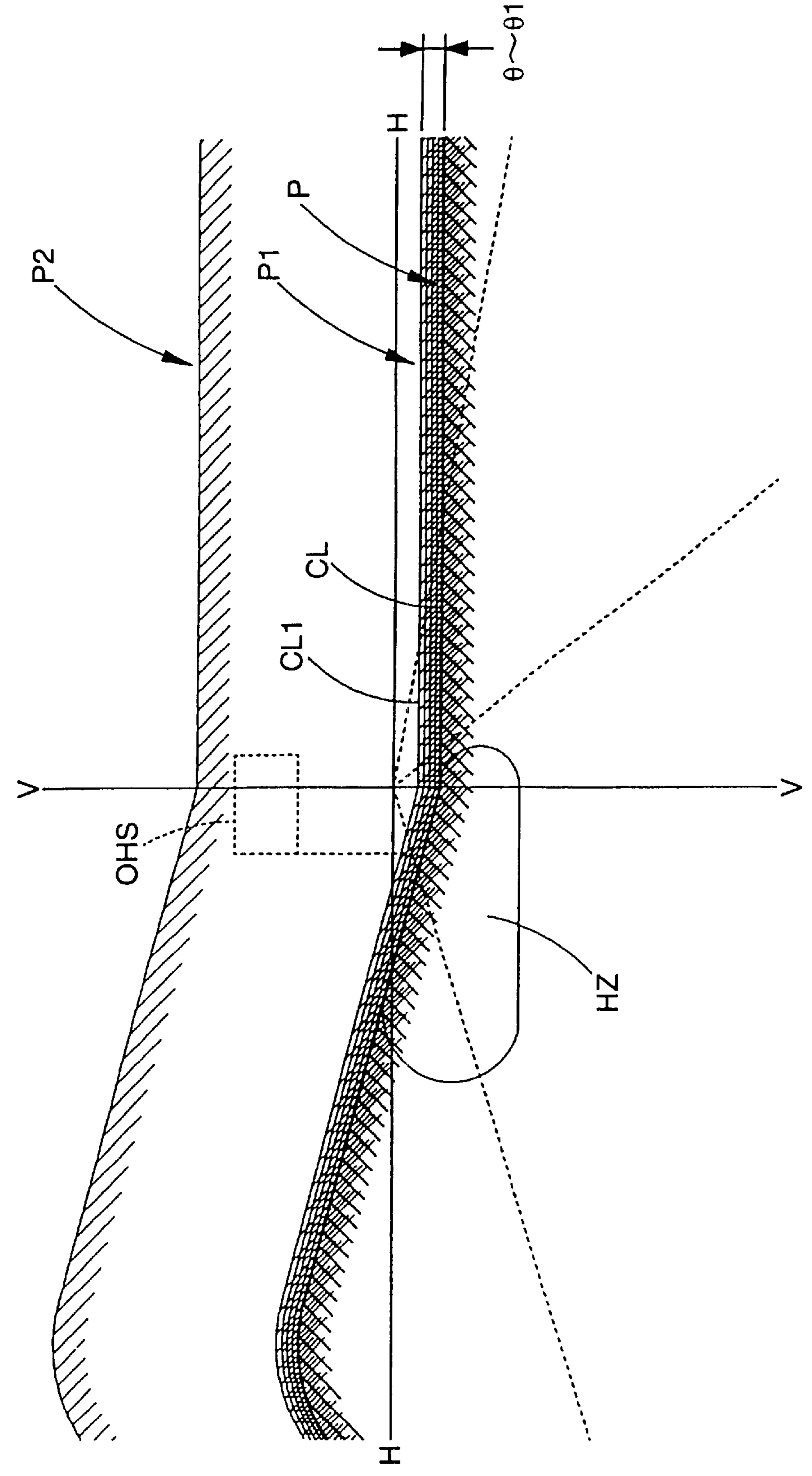
FIG. 8 illustrates a luminous intensity distribution pattern for low beam light of a headlamp according to another embodiment.

FIG. 8 illustrates a portion of a low-beam luminous intensity distribution pattern formed forwardly of the vehicle by the illuminating light from the headlamp in accordance with the embodiment.

As shown in FIG. 8, the luminous intensity distribution pattern for low beam a basic luminous intensity distribution pattern P, an additional luminous intensity distribution pattern P1, and a second additional luminous intensity distribution pattern P2.

The basic luminous intensity distribution pattern P is formed by the light beam B propagating from the general portion of the front-side surface 18$a$ of the focusing lens 18 and has a borderline CL onto which the shape of the upper edge 22$a$ of the light shielding plate 22 is projected.

The additional luminous intensity distribution pattern P1 is formed by the light beam B1 propagating from the lens elements 18$s$ and 18$s$1 of the front-side surface 18$a$ of the focusing lens 18. The additional luminous intensity distribution pattern P1 is formed as a plurality of distribution patterns in which the basic luminous intensity distribution pattern P is displaced upwardly by small angles $\theta$ to $\theta 1$.

The total intensity of light transmitted through the lens elements 18$s$ and 18$s$1 can be substantially greater than the intensity of light transmitted through the lens element 18$s$ of the previous embodiment. However, since the intensity of light transmitted through each of the lens elements is small, and the position of the borderline CL1 in the additional luminous intensity distribution pattern P1 is slightly offset vertically by small degrees, the light-dark ratio of the borderline CL1 becomes quite low. Moreover, since the intensity of light of the basic luminous intensity distribution pattern P itself becomes smaller than in the case of the previous embodiment, and the light-dark ratio of the borderline CL becomes low, the light-dark ratios of the borderlines CL and CL1 are effectively reduced as the luminous intensity distribution pattern for low beam as a whole.

The second additional luminous intensity distribution pattern P2 is formed by a light beam B2 propagating from the lens element 18$s$2 of the front-side surface 18$a$ of the focusing lens 18. The additional luminous intensity distribution pattern P2 is formed as a distribution pattern in which the basic luminous intensity distribution pattern P is displaced upwardly by an angle $\theta 2$. The arrangement provided is such that an overhead sign OHS installed above the road surface forward of the vehicle can be illuminated by this second additional luminous intensity distribution pattern P2.

According to the embodiment, in the same way as the previous embodiment, the light-dark ratio of the borderline in the luminous intensity distribution pattern for low beam can be reduced without producing drawbacks such as irregular color. Furthermore, the light-dark ratio of the borderline can be reduced more effectively as compared with the previous embodiment. Moreover, according to the embodiment, the overhead sign OHS can be illuminated by making use of the lens element 18$s$2 formed on the front-side surface 18$a$ of the focusing lens 18.

In the embodiment, the number of the lens elements 18$s$1 can be, for example, 8 to 12, and the number of the lens elements 18$s$2 can be 1 or 2.

A description will be given on another embodiment of the invention.

Figure 9:
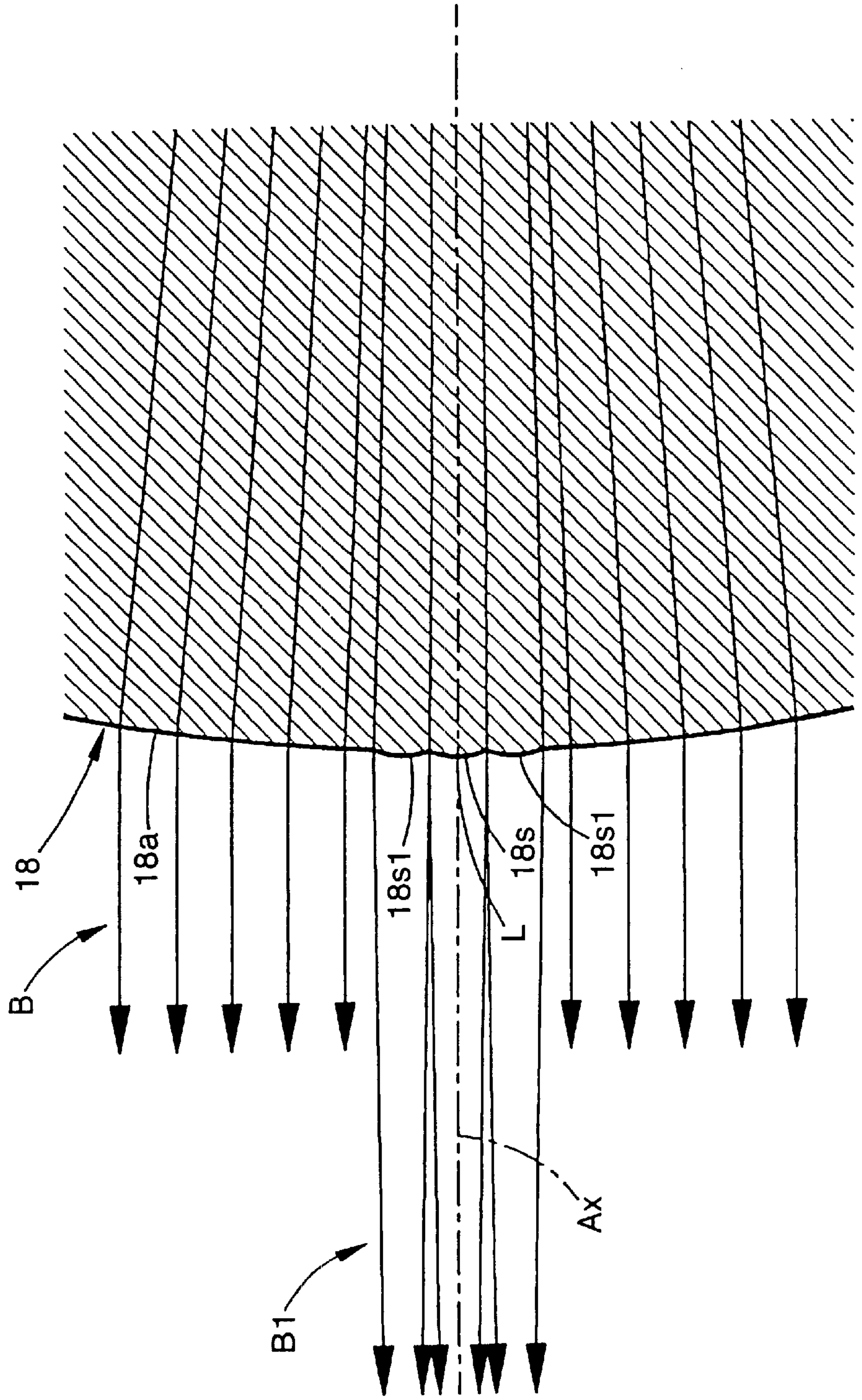
FIG. 9 illustrates a headlamp according to another embodiment of the invention.

FIG. 9 illustrates a portion of a headlamp for a vehicle in accordance with the embodiment.

The basic configuration of the headlamp for a vehicle in accordance with the embodiment is similar to that of the first embodiment as shown in FIG. 3 except for the arrangement of the front-side surface 18$a$ of the focusing lens 18.

Although the embodiment is similar to the first embodiment in that the lens element 18$s$ is formed to extend in the horizontal direction along the line of intersection L between the front-side surface 18$a$ and the horizontal plane including the optical axis Ax, the embodiment differs in that two lens elements 18$s$1 extending in the horizontal direction are adjacently formed at the upper and lower sides of the lens element 18$s$, and that the lens elements 18$s$ and 18$s$1 are formed as convex cylindrical lens elements.

The light beam B1 transmitted through the focusing lens 18 and propagating forwardly from the lens elements 18$s$ and 18$s$1 can become diffused in the vertical direction. The angle of vertical diffusion of these lens elements 18$s$ and 18$s$1 can be set to a small angle (e.g., approximately 0.2 to 0.60°).

Figure 10:
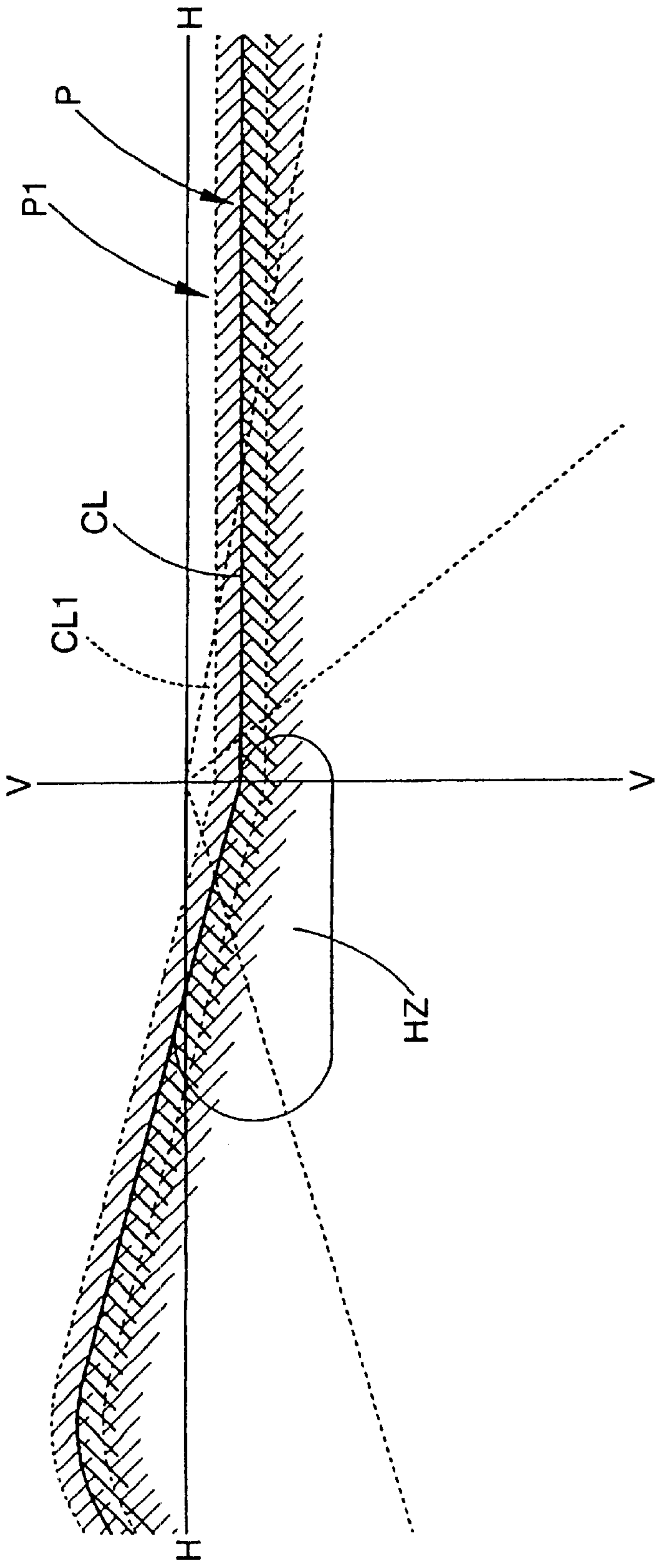
FIG. 10 illustrates a luminous intensity distribution pattern for low beam light of a headlamp according to another embodiment.

FIG. 10 illustrates a portion of a low-beam luminous intensity distribution pattern formed forwardly of the vehicle by the illuminating light from the headlamp in accordance with this embodiment.

As shown in FIG. 10, the luminous intensity distribution pattern comprises a basic luminous intensity distribution pattern P and an additional luminous intensity distribution pattern P1.

The basic luminous intensity distribution pattern P is formed by the light beam B propagating from the general portion of the front-side surface 18$a$ of the focusing lens 18 and has a borderline CL onto which the shape of the upper edge 22$a$ of the light shielding plate 22 is projected.

The additional luminous intensity distribution pattern P1 is formed by the light beam B1 propagating from the lens elements 18$s$ and 18$s$1 of the front-side surface 18$a$ of the focusing lens 18. The additional luminous intensity distribution pattern P1 is formed as a distribution pattern in which the basic luminous intensity distribution pattern P is displaced upwardly by a small angle. The intensity of light transmitted through the lens element 18$s$ is smaller than the intensity of light transmitted through the general portion other than the lens element 18$s$. Since the lens element 18$s$ transmits a bundle of rays in the horizontal plane including the optical axis Ax, which contributes mostly to the formation of the borderline in the front-side surface 18$a$, the luminous intensity in the vicinity of the borderline CL1 in the additional luminous intensity distribution pattern P1 becomes relatively high, although it is slightly diffused in the vertical direction. Accordingly, the light-dark ratio of the borderline CL in the basic luminous intensity distribution pattern P is sufficiently reduced by the additional luminous intensity distribution pattern P1.

According to the embodiment, the light-dark ratio of the borderline in the luminous intensity distribution pattern for low-beam can be reduced without producing drawbacks such as irregular color.

The light source of the headlamp 10 of the embodiments is the discharge light-emitting portion 12$a$ of the discharge bulb 12. However, the light source may be a filament or the like of a halogen bulb and still obtain advantages similar to those of the embodiments.

Other embodiments are within the scope of the following claims.

What is claimed is:

1. A headlamp for a vehicle comprising:

a light source disposed on an optical axis of the headlamp extending in a longitudinal direction of the vehicle;

a reflector for reflecting light from the light source in a forward direction close to the optical axis;

a focusing lens disposed forwardly of the reflector and formed by a plano-convex lens, whose front-side surface facing away from the light source is convex;

a light shielding plate interposed between said focusing lens and said reflector to eliminate upward illuminating light by shielding part of the reflected light from the reflector; and a lens element extending in a substantially horizontal direction along a line of intersection between the front-side surface of the focusing lens and a horizontal plane including the optical axis of the headlamp, the lens element being formed on the exterior surface of the focusing lens.

2. The headlamp of claim 1 wherein the lens element is configured to vertically straddle the line of intersection.

3. The headlamp of claim 1 wherein the lens element comprises an upwardly deflecting prism lens element.

4. The headlamp of claim further comprising additional lens elements, each extending in the substantially horizontal direction across the front-side surface of the focusing lens and disposed on either an upper or lower side of the lens element along the line of intersection.

5. The headlamp of claim 4 wherein each of the lens elements comprises deflecting prism lens element.

6. The headlamp of claim 4 wherein each of the lens elements comprises a cal lens element.

7. A headlamp for a vehicle comprising:

a light source at a base of the headlamp;

a reflector, for reflecting light from the light source, extending from the base;

a focusing lens disposed forwardly of the reflector and opposite to the light source; and an upwardly deflecting prism lens configured to deflect light upward by an angle of 0.2 to 0.6 degrees, extending in a substantially horizontal direction across an exterior surface of the focusing lens, the exterior surface facing away from the light source.

8. A headlamp for a vehicle comprising:

a light source at a base of the headlamp;

a reflector, for reflecting light from the light source, extending from the base;

a focusing lens disposed forwardly of the reflector and opposite to the light source;

an upwardly deflecting prism lens element having a width of 1 to 2 mm aligned with an optical axis of the headlamp, extending in a substantially horizontal direction across an exterior surface of the focusing lens, the exterior surface facing away from the light source; and additional upwardly deflecting prism lens elements having a width of 1 to 2 mm, each extending substantially in the horizontal direction across the exterior surface of the focusing lens and disposed on either an upper or lower side of the lens element aligned with the optical axis.

9. A headlamp for a vehicle comprising:

a light source at a base of the headlamp;

a reflector, for reflecting light from the light source, extending from the base;

a focusing lens disposed forwardly of the reflector and opposite to the light source;

a lens element aligned with an optical axis of the headlamp, extending in a substantially horizontal direction across an exterior surface of the focusing lens, the exterior surface facing away from the light source; and additional lens elements, each extending substantially in the horizontal direction across the exterior surface of the focusing lens and disposed on either an upper or lower side of the lens element aligned with the optical axis, wherein the additional lens elements and the lens element between the additional lens elements are configured to have a different angle of deflection.

10. A headlamp for a vehicle comprising:

a light source at a base of the headlamp;

a reflector, for reflecting light from the light source, extending from the base;

a focusing lens disposed forwardly of the reflector and opposite to the light source;

a lens element aligned with an optical axis of the headlamp, extending in a substantially horizontal direction across an exterior surface of the focusing lens, the exterior surface facing away from the light source;

additional lens elements, each extending substantially in the horizontal direction across the exterior surface of the focusing lens and disposed on either an upper or lower side of the lens element aligned with the optical axis; and a peripheral lens element, configured to deflect at an angle of 4 to 6 degrees, extending substantially in the horizontal direction across the exterior surface of the focusing lens and located below the lower additional lens element.

* * * * *